July 18, 1961
C. E. CUSHMAN ET AL
2,992,790
SAFETY HARNESS DEVICE
Filed Sept. 6, 1955
3 Sheets-Sheet 2
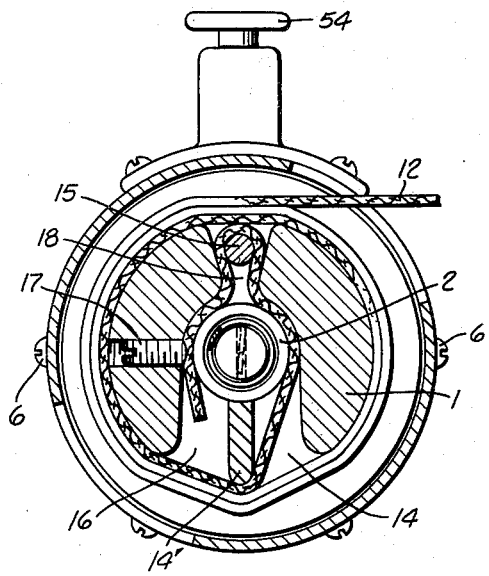
FIG_4
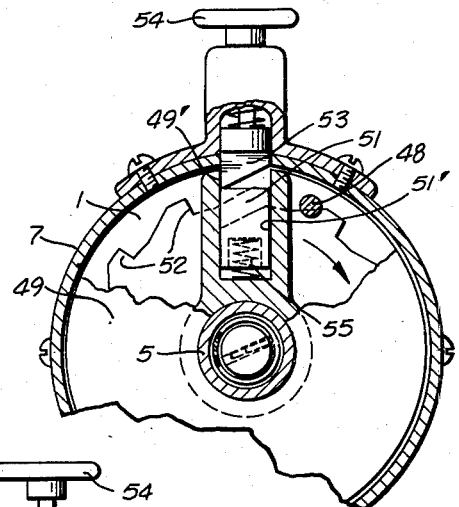
FIG_5
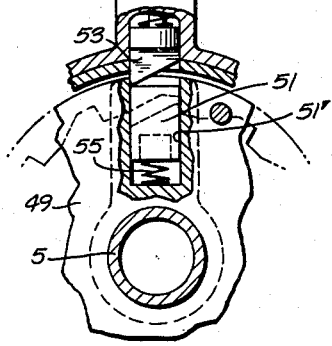
FIG_5A
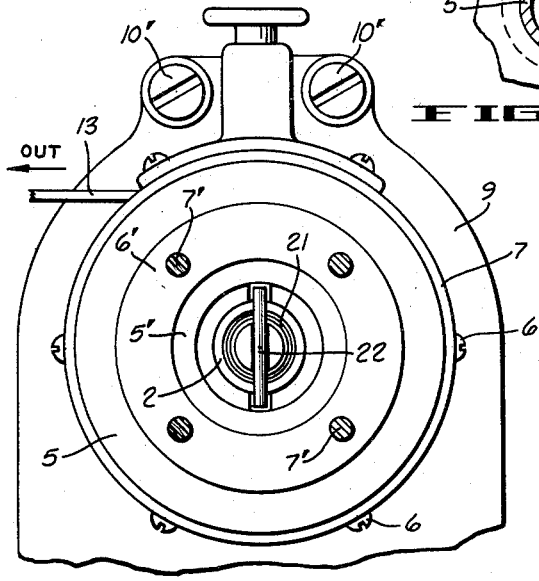
FIG_6
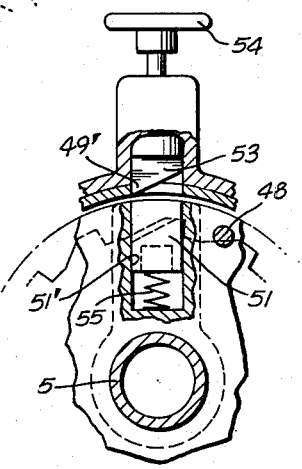
FIG_5B
CLIFFORD E. CUSHMAN &
ROBERT J. WRIGHTON
BY                INVENTORS
Paul B. Hunter
ATTORNEY July 18, 1961  C. E. CUSHMAN ET AL  2,992,790
SAFETY HARNESS DEVICE
Filed Sept. 6, 1955  3 Sheets-Sheet 3
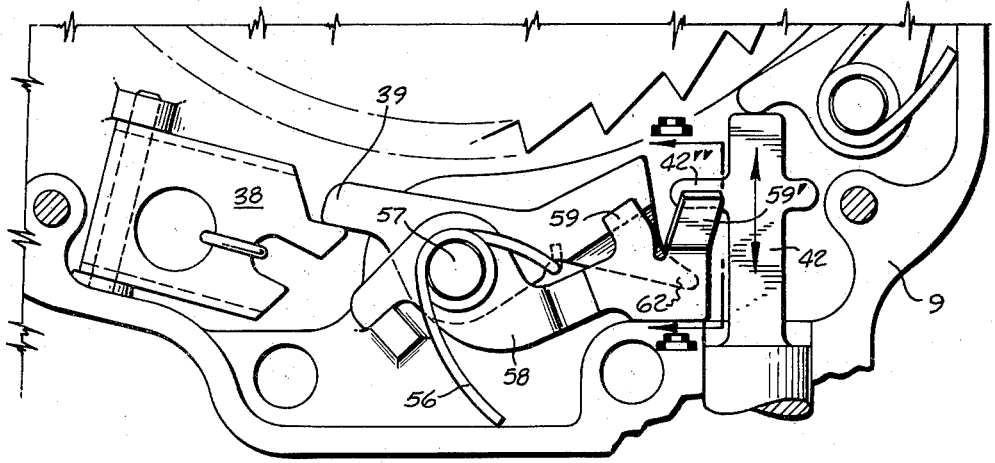
FIG_7
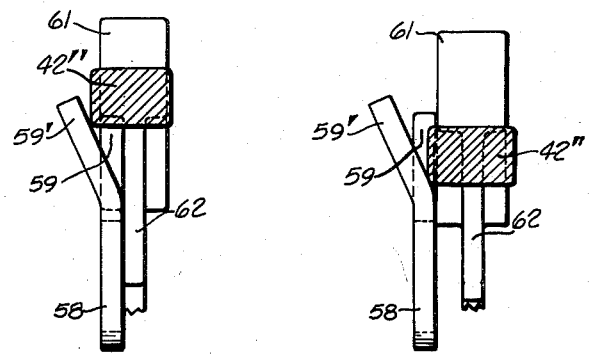
FIG_8  FIG_8A
CLIFFORD E. CUSHMAN &
ROBERT J. WRIGHTON
BY          INVENTORS
ATTORNEY United States Patent Office 2,992,790
Patented July 18, 1961

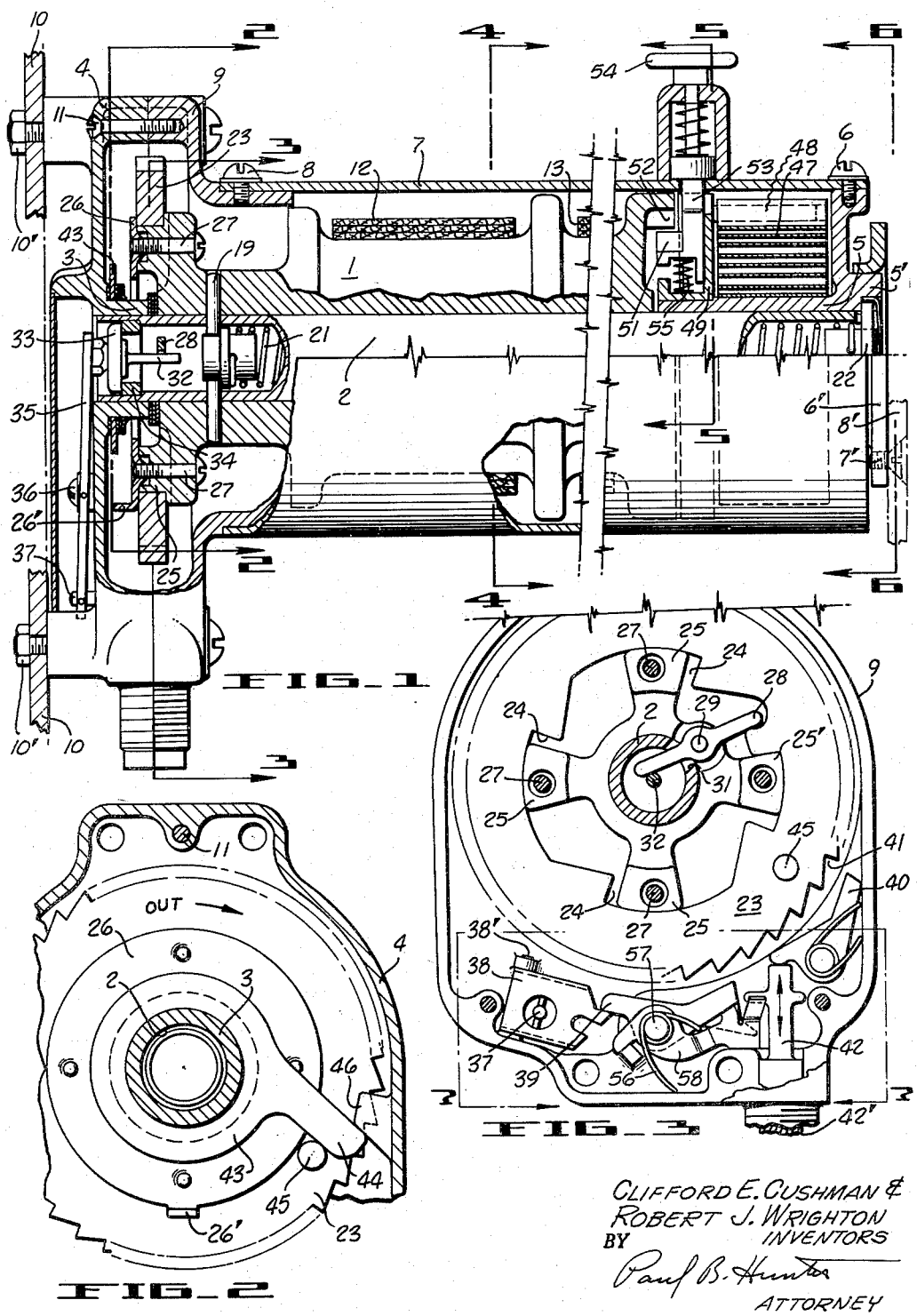

2,992,790
SAFETY HARNESS DEVICE
Clifford E. Cushman, Burbank, and Robert J. Wrighton, Tarzana, Calif., assignors, by mesne assignments, to Pacific Scientific Company, San Francisco, Calif., a corporation of California
Filed Sept. 6, 1955, Ser. No. 532,631
15 Claims. (Cl. 242—107.4)

This invention relates, in general, to safety harness devices for use in protecting passengers in moving vehicles and more particularly to novel improvements in inertia-operated safety devices utilized to automatically lock passengers in their seats during crashes and the like.

There is disclosed in United States patent application Serial No. 396,038, now Patent No. 2,845,234, a novel inertia-operated safety device of the type to which the present invention relates. The object of the present invention is to provide an improved inertia-operated safety device constructed so as to insure safer, more dependable operation under all types of extreme operating conditions.

One feature of the present invention is the provision of a novel internal stop device which operates to limit to a desired distance of revolution the cable reel or harness spool in the wind-up direction.

Another feature of the present invention is the provision of novel means for preventing the safety device from unlocking falsely and prematurely during wind-up of the cable or harness straps after automatic lock-up.

Another feature is the provision of novel apparatus which may be rendered effective under proper conditions to reel in the cable or harness straps with a comparatively great force which pulls the passenger against the seat back and restrains him tightly therein.

These and other features of this invention will become apparent after a perusal of the following description of the embodiments of this invention disclosed in the drawings wherein, FIG. 1 is a front elevation view partly in longitudinal section of one embodiment of the present invention utilized in a harness-spool type of safety device, FIG. 2 is a cross-section view taken along section line 2—2 in FIG. 1 showing the internal stop device, FIG. 3 is another cross-section view taken through FIG. 1 along section line 3—3 disclosing the novel structure for preventing false unlocking during wind-up, FIG. 4 is another cross-section view taken along section line 4—4 in FIG. 1 disclosing the novel means for securing the ends of the harness to the harness reel, FIG. 5 is a cross-section view taken along section line 5—5 in FIG. 1 showing the novel forced-retention device, FIGS. 5A and 5B are views of the apparatus disclosed in FIG. 5 showing the apparatus in two different positions of operation, FIG. 6 is an end view of the safety reel taken along line 6—6 showing a portion of the mounting means utilized to mount the safety reel on the back of the pilot's seat, FIG. 7 is an enlarged view of a portion of the apparatus shown in FIG. 3 and encircled by the dash-dot lines 7—7, and FIGS. 8 and 8A are section views taken through FIG. 7 along section line 8—8 showing the apparatus in two different operating positions.

Referring now to FIGS. 1 through 8A, there is shown an inertia-operated device of the harness-spool type especially adapted for use by pilots in aircraft. This safety device is of the type where the harness strap or web which passes over the pilot's body and serves to hold the pilot within his seat is wound directly on an elongated spool. This harness spool or drum 1 is fixedly secured, as by a key and key-way arrangement, to an elongated, hollow cylindrical shaft 2 which is rotatably mounted on the left-hand side in a bearing portion 3 of a main housing section 4 and on the right-hand side in a bearing member 5. The bearing member 5 is fixedly secured as by screws 6 within one end of a hollow cylindrical housing 7, the other end of which is secured as by screws 8 to main housing section 9 which, in turn, is secured to the main housing section 4 as by screws 11. The two tension members or harness straps 12 and 13 which pass over the two shoulders of the pilot are secured at their inner ends to the spool in a novel manner as illustrated in FIG. 4 and hereafter described for strap 12. The strap or webbing 12 extends over the top of spool partition or wall 14', through a cavity 14 in the spool 1, around one side of the central shaft 2, loops over a pin 15, and back down along the other side of the shaft 2 and into a cavity 16. A pair of set screws 17 clamp the strap 12 against the center shaft 2. Actually the set screws are not relied upon for holding power but merely to retain the end of the strap 12 in place. The pin 15 is loose within its accommodating tapered slot 18 in the spool and is of the same length as the harness webbing width. The greater the pull on the strap 12, the harder the pin 15 wedges the webbing 12 into the tapered slot, thus producing a self-energizing anchoring structure which increases in effectiveness as the pull on the strap increases.

In the novel method of mounting this safety device, the left-hand (see FIG. 1) or larger end of this device is fixedly secured to a bracket or plate 10 by a plurality of bolts 10', for example four, extending through the bracket and the housing 4, 9. The bracket or mounting base 10 is in turn securely affixed to the back of the seat. The bearing member 5 is fixedly secured in rigid alignment with the bearing 3 since it is mounted on the housing section 4 by means of the cylindrical housing 7. A circular mounting flange 5' is located on the outer surface of the bearing member 5 and loosely mounted thereon is an adjustable mounting ring 6' (FIG. 6). This ring 6' is mounted as by screws 7' on a secondary mounting base or bracket 8' which is securely affixed to the back of the seat. The adjustable mounting ring 6' may be moved axially with respect to the harness reel housing, and it can be rotated before affixing it to bracket 8'. Since the bore in the mounting ring 6' is somewhat oversize with respect to the flange 5', certain angular misalignment between the right and left reel mounting brackets 10 and 8', due possibly to a warped seat or slightly misaligned mounting holes or the like, can be tolerated without producing any misalignment of the bearings 3 and 5 and resultant binding of the spool shaft 2.

A pin 19 serves to anchor one end of a wind-up coil spring 21 in the spool 1, the other end of spring 21 being anchored by a pin 22 in the bearing member 5. This coil spring is tensioned so as to urge the spool 1 in the harness wind-up direction, counter-clockwise as viewed in FIG. 4.

An annular inertia member 23 is rotatably mounted on the left-hand end of the spool 1, recesses 24 in the member 23 accommodating integral lugs 25 on the spool end. An annular retainer ring 26 and screws 27 are utilized to hold the inertia member 23 on the spool, the lugs 25 limiting the distance of rotation of the inertia member relative to the spool to a very short arc. Drive link 28 is pivotally mounted at 29 on the spool 1, the drive link extending through an opening 31 into the hollow shaft 2 where it engages a drum shaft 32, the flanged edge 33 of which rides on an annular support member 34 which is fixedly secured in the shaft 2. The drum shaft 32, 33 is held in place by a spring-loaded rocker arm 35 which is spring-tensioned in a clockwise direction as viewed in FIG. 1 around a pivot pin 36. The other end of rocker arm 35 carries a pin 37 which engages a sear 38 pivotally mounted at 38' (FIG. 3), the pivoted sear serving as a trigger for a locking pawl 39.

To describe the operation of that part of the apparatus heretofore mentioned, as the webbing 12 and 13 is pulled off of the spool in response to movements of the pilot's body and is rewound on the spool by the rotation of the spool in response to the tension of wind-up spring 21, the inertia member 23 tends to resist rotation due to its weight. In the wind-up direction, the lug 25' drives the inertia member, while in the unwind direction the inertia member is driven by means of drive link 28. During feed out of the web 12, 13 at less than a predetermined acceleration, the inertia member rotates with the spool. When the pull exceeds such value of acceleration, the inertia member tends to remain stationary when the spool rotates, thus causing link 28 to pivot and tip the drum shaft 32 which, in turn, pivots arm 35 to trigger the sear 38 and release pawl 39. Pawl 39, tensioned by the pawl spring 56, pivots to engage the ratchet teeth 41 located in the periphery of the inertia member. The spool is restrained from further rotation in the unwind direction but the pawl will ratchet over the ratchet teeth to permit the spool to rotate in the wind-up direction. Release from the locked condition is accomplished by pulling the manual control cable 42', the termination 42 engaging and returning pawl 39 to its normal position where it is held triggered by sear 38, after which the termination 42 is returned to its normal position as shown in FIG. 3. Operation of the associated anti-rebound member 58 will be subsequently described. The spool may be manually locked by pulling termination 42 away from the locking pawl 40 so that pawl 40 may rotate and engage the ratchet teeth 41.

Novel means is incorporated for providing a positive internal stop for the spool in the wind-up direction. In the unwind direction, the harness webbing is permitted to unwind from the spool to its full length. Referring to FIGS. 1 and 2, a rotating fly stop or stop member 43 is mounted on the bearing 3 so as to be freely rotatable thereon, said fly stop including an extension or arm 44. A pin 45 is embedded in the inertia member 23 and extends outwardly therefrom so as to be in a position to engage one edge of the arm 44 of the fly stop. A lug 26' extends out from the edge of the retainer ring 26 so as to be in a position to engage the opposite edge of the fly stop arm 44. A stationary stop 46 is integral to the housing 4 and positioned so that it may be engaged by the arm 44. FIG. 2 shows the device rotated to its furthest position in the wind-up direction. The pin 45 engages the front or forward edge of the arm 44 and urges the back or rearward edge of the arm 44 against the stop 46. The inertia member 23 and therefore the spool is thus prevented from any further rotation in the wind-up direction. As the webbing starts to unwind, the pin 45 leaves the arm 44. The lug 26' makes about three quarters of a revolution and contacts arm 44 at its back edge. Further rotation of lug 26' drives the arm 44 of the fly stop ahead of it and the pin 45 through almost another revolution before the harness is unwound to its full extent from the spool. This full unwind position is reached before the arm 44 can again strike the stop 46. In wind-up of the webbing, the pin 45 engages the arm 44 and drives it against the stop 46 to bring the webbing to a positive stop within two revolutions of the spool. By variations in the width of arm 44 or location of pin 45 or stop 46, the distance of revolution may be varied as desired. The lug 26' is employed to drive the arm 44 in the unwind direction so that pin 45 does not engage the arm 44 and cause the frictional drag of the rotating fly stop 43 to effect the inertia member 23.

In actual use of this safety device, it is in most cases secured on the back of the pilot's seat near the top. Such seats are often of the ejection type which operate on triggering to catapult from the airplane. A novel structure is incorporated in the device to act, upon triggering of the ejection mechanism, to pull the pilot securely into the seat and restrain him there during ejection of the seat from the plane. On the right-hand end of the spool of FIG. 1 is shown a very heavy spiral spring 47, the inner end of which is fixedly attached to the bearing 5. The other end of spring 47 is secured to a pin 48 which is embedded in a spring carrier member 49 rotatably mounted on bearing 5. A dog 51 is also slidably mounted in slot 51' (see FIGS. 5, 5A and 5B) in said spring carrier member, under the control of a manually operable plunger 53, said dog being adapted to engage teeth 52 cut into the right-hand end of drum or spool 1. It is to be understood, of course, that plunger 53, shown here terminated in knob 54, would most probably be connected, in use, to a control cable connected to a manual control at the pilot's hand or an automatic control associated with the ejection apparatus which is actuated preliminary to ejecting.

During the normal operations of the harness spool, the control plunger 53 is in its lowermost position as shown in FIG. 5. The plunger 53, in this position, maintains the dog 51 away from engagement with the teeth 52 and, in addition, holds the heavily-tensioned spring carrier 49, at point 49', from rotating under the force of spring 47. Prior to ejection of the seat, the plunger 53 is moved upwardly and, during initial movement, permits the dog 51 to raise, under the force of a spring 55, and engage the teeth 52 (see FIG. 5A). Further upward movement of plunger 53 causes it to become disengaged from the spring carrier at point 49' (see FIG. 5B) and all the pent-up force of the spring 47 is released to rotate the spring carrier and, through dog 51 and teeth 52, the spool in the harness wind-up direction. This powerful reeling-in force draws the pilot firmly into the seat with his back against the back of the seat and holds him there during subsequent ejection.

Referring to FIGS. 7, 8 and 8A there is shown a novel structure for preventing the safety device from falsely releasing from a locked condition during wind-up, after locking, of the slack harness. As previously described, excessive acceleration of the harness causes the sear 38 to pivot and release the pawl 39, which, under the force of spring 56, rotates into engagement with the teeth 41 in inertia member 23. The pawl will ratchet in an oscillating manner over the teeth 41 during wind-up of the harness. During periods of high speed harness reel-in, a point may be reached where the oscillating speed of the pawl is close to the natural frequency of the pawl-spring combination. At this point, the end of the pawl may bounce completely clear of the ratchet teeth and, in fact, may move far enough to be engaged and held in a released position by the sear 38, thus prematurely releasing the harness spool. To prevent this, an anti-rebound member 58 is rotatably mounted on shaft 57 which also rotatably mounts the pawl 39 (FIGS. 3 and 8), this anti-rebound member 58 being held against the upper surface of the pawl 39 by spring 56. During periods when the pawl 39 is held in the normal or unlock position by the sear 38, an extension or arm 59 on member 58 rides on the top surface of the main pawl portion 61. When the pawl 39 is released by sear 38 for automatic locking, the pawl pivots and rides out from under the arm 59, which then drops down behind the main pawl portion 61 onto the triangular-shaped lower ledge portion 62 of pawl 39 (see FIG. 8). If now the pawl bounces, its distance of movement is limited by the end of arm 59 which strikes the edge of main pawl portion 61, the distance of movement of pawl 39 being such that it is unable to fall under sear 38 and therefore unable to falsely unlock the cable reel. When the manual unlocking control cable is pulled, the extension 44" on cable termination 42 first passes under a slanted extension 59' of member 58 and lifts the anti-rebound member 58 (FIG. 8A), the extension 42" then engaging the pawl 39 to rotate it to its triggered position behind sear 38. Since the anti-rebound member 58 was lifted, the pawl portion 61 passes underneath without obstruction. When the cable termination 42 is pushed back to its normal position, the anti-rebound member is lowered to its normal position with arm 59 on top of the main pawl portion 61.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A safety reel device comprising a tension member, a reel rotatably mounted in said device adapted to rotate in one direction to wind-up said tension member thereon and in the other direction to unwind the tension member, a stop member rotatably mounted in axial alignment with said reel, drive means for coupling said reel to said stop member to drive said stop member in rotation in one direction with said reel, and means for limiting the distance of rotation of said stop member to thereby limit the distance of rotation of said reel.

2. A safety device as claimed in claim 1 wherein said stop member includes an arm extending radially from the axis of revolution, said drive means engaging said arm during rotation of the reel in said one direction.

3. A safety device as claimed in claim 2 wherein said drive means comprises a pin coupled to the reel, said pin adapted to engage said stop member.

4. A safety device as claimed in claim 2 wherein said limiting means comprises a stop fixedly mounted in said device for engaging said arm to thereby limit rotation thereof.

5. An inertia-operated safety device comprising a tension member, a rotatably mounted reel having said tension member secured thereon, said reel having a plurality of ratchet teeth positioned therein, first resilient means coupled to said reel for urging rotation of said reel in a direction to wind said tension member on said reel to take up slack in said tension member, said reel rotating in the opposite direction resulting from pulls on the tension member to unwind said tension member from said reel, a dog member adapted to engage said ratchet teeth in driving relationship, a second resilient means tensioned so as to forcefully drive said reel through said dog member in the wind-up direction against normal forces tending to hold the tension member unwound from the reel, said second resilient means being normally uncoupled from said reel, means including said dog member for coupling said second resilient means to said reel to at times cause said reel to forcefully wind-up said tension member, a plunger member normally positioned to engage said dog member and hold it from engagement with said ratchet teeth, and means for retracting said plunger member to free said dog member for engagement with said ratchet teeth.

6. An inertia operated safety device as claimed in claim 5 including means for restraining rotation of said reel after engagement of said dog member and ratchet teeth until further retraction of said plunger is accomplished to thereby insure proper dog-teeth contact.

7. An inertia operated safety device comprising a tension member, a reel having said tension member wound thereon, resilient means coupled to said reel for urging rotation of said reel in a direction to wind said tension member on said reel, said reel having a plurality of ratchet teeth associated therewith, a pawl operated at times from a normal position to a lock position engaging said ratchet teeth to prevent rotation of said reel in the unwind direction, said pawl ratcheting over said ratchet teeth during rotation of the reel in the wind-up direction, and means for preventing said pawl from bouncing back to said normal position during ratcheting of said pawl over said teeth, said last means including an anti-rebound member adapted to move in behind said pawl when said pawl moves from said normal unlocked position to engagement with said teeth.

8. An inertia operated safety device as claimed in claim 7 including a release cable member for lifting said anti-rebound member from behind said pawl and for moving said pawl to said normal unlocked position away from engagement with said teeth, said anti-rebound member resting on the top surface of said pawl after said release cable member is moved from engagement with the pawl.

9. A safety reel device comprising a tension member, a reel rotatably mounted in said device and having said tension member secured thereto, resilient means coupled to said reel for urging rotation of said reel in a direction to wind said tension member on said reel to take up slack in said tension member, said reel rotating in the opposite direction resulting from pulls on the tension member to unwind said tension member from said reel, a stop member rotatably mounted in axial alignment with said reel, said stop member having an arm extending radially outward from the axis of revolution, drive means coupled to said reel for engaging one side of said arm to drive said arm in the unwind rotational direction with said reel and for engaging the opposite side of said arm to drive said arm in the wind-up rotational direction with said reel, and a stop means for engaging said stop arm in at least one direction of its rotation to prevent further rotation of said stop arm and therefore of said reel whereby the distance of rotation of said reel may be limited.

10. A safety reel as claimed in claim 9 including an inertia member coupled to said reel for rotation therewith, said drive means being fixedly secured to said inertia member.

11. A safety reel device comprising a tension member, a reel rotatably mounted in said device and having said tension member secured thereto, resilient means coupled to said reel for urging rotation of said reel in a direction to wind said tension member on said reel to take up slack in said tension member, said reel rotating in the opposite direction resulting from pulls on the tension member to unwind said tension member from said reel, and means operative on rotation of said reel in one rotational direction after more than one complete revolution of said reel to engage said reel to prevent further rotation thereof in said one rotational direction, said means comprising a stop member rotatably mounted in said device for rotatable movement independent of said rotational movement of the reel, drive means for coupling said stop member to said reel for at times causing said reel to drive said stop member in the unwind direction, and means for limiting the rotational movement of said stop member, thereby limiting the rotational movement of said reel coupled to said stop member through said drive means.

12. An inertia-operated safety device comprising a tension member, a reel having said tension member wound thereon, resilient means coupled to said reel for urging rotation of said reel in a direction to wind said tension member on said reel, said reel having a plurality of ratchet teeth associated therewith, ratchet engaging means operated at times from a normal position unengaged from said ratchet teeth to a lock position engaging said ratchet teeth to prevent rotation of said reel in the unwind direction, resilient means for urging said ratchet engaging means into said lock position, said ratchet engaging means overcoming said resilient means and ratcheting over said ratchet teeth during rotation of the reel in the wind-up direction, and anti-rebound means for preventing said ratchet engaging means from moving back to said normal position during ratcheting of said ratchet engaging means over said ratchet teeth, said last means including a member adapted to move into a position behind said ratchet engaging means, after it has moved from said normal position to said locked position under urging of said resilient means, to prevent return of said ratchet engaging means to said normal position.

13. An inertia-operated safety device as claimed in claim 12 including means for removing said last member from behind said ratchet engaging means at desired times to permit said ratchet engaging means to return to said normal position.

14. Safety apparatus for preventing a seat occupant of a vehicle from being thrown off his seat, comprising an inertia lock device adapted to be mounted on the seat, said device having a rotatably mounted reel therewithin, a flexible connector wound on said reel and extending outwardly of said device for passing over the body of the seat occupant, a yieldable resilient member coupled to said reel and tensioned so as to urge rotation of said reel in the direction to wind up the connector thereon, thereby normally maintaining a light tension on said flexible connector while allowing the same to yield, whereby the seat occupant is permitted freedom of motion, an inertia member turnably movable with respect to said reel, means for connecting said inertia member with said reel, locking means within said device for locking said inertia member and reel against turning movement in the unwind direction, movement of said flexible connector outwardly of said device at a rate exceeding a predetermined acceleration, due to a sudden force tending to dislodge the seat occupant, causing said inertia member to resist the turning of said reel and effect the locking of the reel and inertia member by said locking means, thus positively preventing further outward movement of the flexible connector to retain the seat occupant in his seat, a second resilient member tensioned so as to urge rotation of said reel in the direction to wind up the flexible connector thereon against normal forces tending to hold the flexible connector unwound from the reel, said second resilient member being normally uncoupled from said reel, and means for coupling said second resilient member to said reel to at times cause said reel to forcefully wind up said flexible connector and thus force said seat occupant into his seat against any restraining forces exerted by the seat occupant.

15. A safety apparatus as claimed in claim 14 wherein said reel has a plurality of ratchet teeth positioned therein, a dog member adapted to engage said ratchet teeth in driving relationship, and means for coupling said second resilient means to said dog member.

References Cited in the file of this patent

UNITED STATES PATENTS

| | | |
|---|---|---|
| 1,119,887 | Shanahan | Dec. 8, 1914 |
| 1,127,243 | Hedges | Feb. 2, 1915 |
| 2,078,489 | Forss | Apr. 27, 1937 |
| 2,131,223 | Earll | Sept. 27, 1938 |
| 2,257,099 | Beirise | Sept. 30, 1941 |
| 2,373,704 | Obolensky | Apr. 17, 1945 |
| 2,557,313 | Quilter | June 19, 1951 |
| 2,572,478 | Hawkins | Oct. 23, 1951 |
| 2,634,919 | Strassler | Apr. 14, 1953 |
| 2,701,693 | Nordmark et al. | Feb. 8, 1955 |
| 2,706,603 | Miller | Apr. 19, 1955 |
| 2,708,966 | Davis | May 24, 1955 |
| 2,726,826 | Hoven et al. | Dec. 13, 1955 |